United States Patent
Abedin (10) Patent No.: US 10,234,344 B2
(45) Date of Patent: Mar. 19, 2019

(54) COMPACT MULTICORE FIBEROPTIC DEVICE FOR SENSING COMPONENTS OF FORCE

(71) Applicant: OFS Fitel, LLC, Norcross, GA (US)

(72) Inventor: Kazi S Abedin, Basking Ridge, NJ (US)

(73) Assignee: OFS FITEL, LLC, Norcross, GA (US)

( * ) Notice: Subject to any disclaimer, the term of this patent is extended or adjusted under 35 U.S.C. 154(b) by 239 days.

(21) Appl. No.: 15/424,204

(22) Filed: Feb. 3, 2017

(65) Prior Publication Data

US 2017/0227410 A1 Aug. 10, 2017

Related U.S. Application Data

(60) Provisional application No. 62/291,136, filed on Feb. 4, 2016.

(51) Int. Cl.
| | |
|---|---|
| *G01L 1/24* | (2006.01) |
| *G02B 6/02* | (2006.01) |
| *G02B 6/32* | (2006.01) |
| *G01L 5/16* | (2006.01) |

(52) U.S. Cl.
CPC .............. *G01L 1/242* (2013.01); *G01L 5/166* (2013.01); *G02B 6/02042* (2013.01); *G02B 6/32* (2013.01)

(58) Field of Classification Search
CPC ........... G01L 1/242; G01L 5/166; G02B 6/32; G02B 6/02042
USPC .................................................. 250/227.14
See application file for complete search history.

(56) References Cited

U.S. PATENT DOCUMENTS

| | | |
|---|---|---|
| 4,451,730 A | 5/1984 | Brogardh et al. |
| 4,986,671 A | 1/1991 | Sun et al. |
| 5,298,964 A | 3/1994 | Nelson et al. |

(Continued)

OTHER PUBLICATIONS

E. Cibula et al., "Miniature fiber-optic pressure sensor with a polymer diaphragm," Applied Optics, vol. 44, No. 14, pp. 2736-2744 (2005).

(Continued)

*Primary Examiner* — Seung C Sohn (57) ABSTRACT

A multi-axis force sensor is compact in that it comprises a single strand of optical fiber and a single, movable reflecting element having a reflecting surface separated from a fiber end-face by a gap, and yet is capable of measuring axially and/or laterally applied forces with high sensitivity. The force to be measured causes the reflecting surface to tilt, translate or deform. The single strand of fiber is configured to have multiple cores that carry multiple optical interrogation signals through an end-face of the fiber to incidence on the reflecting surface. The cores are configured so that the propagation vectors of the interrogation signals, as the signals emanate from the fiber end-face, make non-perpendicular angles with that end-face. Furthermore, the cores are configured to capture a portion of the interrogation signals back-reflected from the reflecting surface. The amount of power coupled back into each core is a function of the position of the reflecting surface, which in turn is a function of the magnitude and direction of the applied force. A deformable casing to which the force is applied may surround the reflecting element, the gap and the fiber end-face.

20 Claims, 6 Drawing Sheets

(56) References Cited

U.S. PATENT DOCUMENTS

| | | | |
|---|---|---|---|
| 5,321,501 A * | 6/1994 | Swanson | A61B 1/00096 |
| | | | 250/227.27 |
| 5,859,717 A * | 1/1999 | Scobey | G02B 6/29367 |
| | | | 385/24 |
| 6,925,213 B2 | 8/2005 | Boyd et al. | |
| 7,684,657 B2 | 3/2010 | Donlagic et al. | |
| 7,837,634 B2 | 11/2010 | Costello | |
| 8,567,265 B2 | 10/2013 | Abey et al. | |
| 8,934,740 B2 | 1/2015 | Kim et al. | |

OTHER PUBLICATIONS

D. C. Abeysinghe et al., "A Novel MEMS Pressure Sensor Fabricated on an Optical Fiber," IEEE Photonics Technology Letters, vol. 13, No. 9, pp. 993-995 (2001).

Wikipedia, The Free Encyclopedia, article entitled "Fiber optic sensor," which was available online on Jan. 16, 2017 at website: https://en.wikipedia.org/wiki/Fiber_optic_sensor.

* cited by examiner

$$\theta_0 = 2\left(\theta_i + \theta_T \frac{n_2}{n_1}\right)$$

COMPACT MULTICORE FIBEROPTIC DEVICE FOR SENSING COMPONENTS OF FORCE

CROSS-REFERENCE TO RELATED APPLICATIONS

This invention claims priority from provisional application Ser. No. 62/291,136 filed on Feb. 4, 2016 and entitled "Compact Fiberoptic Force Sensor."

BACKGROUND OF THE INVENTION

Field of the Invention

This invention relates to fiberoptic sensors and, more particularly, to compact fiberoptic force sensors capable of sensing both axial and lateral components of force with high sensitivity.

REFERENCES

The following documents are considered to be relevant to the subject matter of this invention. These documents are incorporated herein by reference:
1. Cibula et al., Applied Optics, Vol. 44, Issue 14, pp. 2736-2744 (2005);
2. Abeysinghe et al., IEEE Phot. Tech. Lett., Vol. 13, No. 9, pp. 993-995 (2001);
3. Aeby et al., U.S. Pat. No. 8,567,265 (2013);
4. Kim et al., U.S. Pat. No. 8,934,740 (2015);
5. Costello, U.S. Pat. No. 7,837,634 (2010);
6. Donlagic et al., U.S. Pat. No. 7,684,657 (2010);
7. Boyd et al., U.S. Pat. No. 6,925,213 (2005);
8. Nelson et al., U.S. Pat. No. 5,298,964 (1994);
9. Sun et al., U.S. Pat. No. 4,986,671 (1991);
10. Brogardh et al., U.S. Pat. No. 4,451,730 (1984); and
11. Wikipedia, The Free Encyclopedia, article entitled "Fiber optic sensor," which was available online on Jan. 16, 2017 at website: https://en.wikipedia.org/wiki/Fiber optic sensor.

Discussion of the Related Art

An optical fiber can be used as a sensor to measure a variety of quantities or characteristics such as, temperature strain, pressure and force by modifying the fiber so that the quantity to be measured modulates the intensity, phase, polarization, wavelength, reflectance or transit time of light propagating in the fiber. (See, Ref 11)

Fiberoptic force sensors have drawn significant interest lately due to their compact size, immunity to electromagnetic fields, and remote sensing capabilities. They have found potential application in various therapeutic applications (e.g., treatment of atrial fibrillation) due to their small size, which allows them to be incorporated inside catheters that have an inside diameter of only a few millimeters.

Figure 1A:
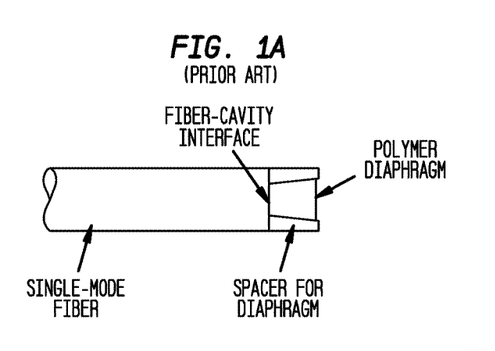
FIG. 1A is a schematic view of a prior art fiberoptic force sensor using a polymer diaphragm as described in Cibula (Ref. 1)
Figure 1B:
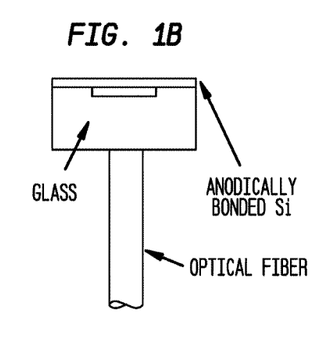
FIG. 1B, 1c are schematic views of a prior art fiberoptic force sensor using a MEMS (micro electro mechanical system) as described in Abeysinghe (Ref 2)
Figure 1C:
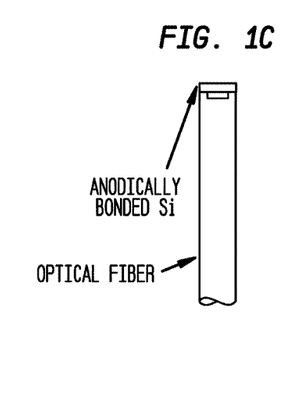

One common way to make a force sensor, as described by Cibula (Ref 1) and Abeysinghe (Ref 2), is to integrate a miniature Fabry-Perot (F-P) cavity at the tip of the fiber (FIGS. 1A and 1B) such that as the sensor touches an external surface, a force is exerted on the F-P cavity. The applied force results in a change in the cavity length, thereby changing the reflectance of the F-P cavity, which can be measured by a suitable optical interrogation signal. Many different variations of such F-P-based sensors have been demonstrated so far. While they demonstrate high sensitivity to changes in cavity length (thereby to the applied force), they are capable of measuring only one component of force—the component that is axial (i.e., directed along the longitudinal axis of the fiber). In some applications, however, a force component applied from a direction other than axial (e.g., lateral) needs to be measured. For example, during certain medical procedures, a fiber sensor is incorporated within a medical catheter, and it is necessary to measure the force (or pressure) imparted as the catheter touches the walls of a patient's blood vessels or some portion of a patient's organ.

Figure 2:
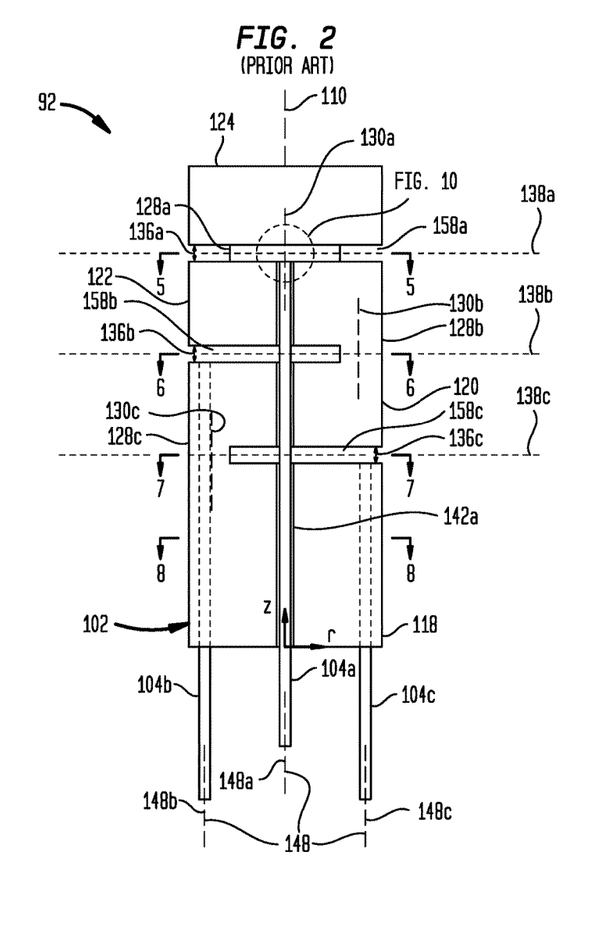
FIG. 2 is a schematic view of a prior art multi-axis fiberoptic force sensor employing three symmetrically positioned fibers. Each fiber tip is provided with a Fabry-Perot (F-P) cavity as described by Aeby (Ref 3)

One can achieve multi-axis force sensing by incorporating multiple fibers symmetrically inside the sensor assembly. An illustration of a prior art multi-axis force sensor is shown herein (FIG. 2) and is described in Aeby (Ref 3). The sensing device comprises three peripherally and symmetrically positioned fibers each of which is provided with a F-P cavity. The tips of the fibers are embedded in a spring-like metal casing in such a way that a force applied laterally on the metal casing results in differential changes in the lengths of the three F-P cavities and their reflectivities. A force applied axially onto the tip of the force sensor assembly changes the three gaps equally, resulting in equal changes in the reflectivities. Thus, by measuring the reflectivities and comparing them to one another, the magnitude and direction of the applied force can be determined.

As explained above, fiber sensors of this type measure external force from a change in gap length of F-P cavities. The change in gap length $\delta L$ due to a small tilt angle $\delta\theta$ of the sensor tip can be expressed as, $\delta L = \delta\theta * R$, where the asterisk indicates multiplication, R is the distance of the fiber from the central longitudinal axis of the sensor fiber. To cause enough differential change in the gap due to a laterally applied force, the fibers need to be sufficiently separated from one another, at least by a millimeter. This design results in a sensor where the fibers are widely spaced, limiting miniaturization of the catheter. Also, due to the complicated structure of the sensor cost becomes prohibitively high.

A need remains, therefore, for a fiber force sensor that can measure both axial and lateral forces with high sensitivity. There is also a need for such a sensor that is sufficiently compact to fit within a medical catheter.

BRIEF SUMMARY OF THE INVENTION

In accordance with one aspect of the invention, a fiberoptic device for sensing axial and/or lateral components of force comprises a light guiding optical element carrying a multiplicity of optical interrogation signals that emit from an end-face of the light guiding optical element. The propagation vectors of the interrogation signals have directions different from one another. A reflecting surface is spaced apart from the end-face, and each of the interrogation signals emitting from the end-face are directed to the reflecting surface. A portion of each interrogation signal is back-reflected from the reflecting surface into the same light guiding optical element from which that interrogation signal was emitted. The back-reflected portions are related to a position of the reflecting surface with respect to the end-face; where the term position denotes a combination of the orientation of the reflecting surface relative to the end-face and a distance it is separated from that end-face. In a preferred embodiment of this aspect of the invention, the reflecting surface is movable (i.e., translatable, tiltable, deformable) in response to a force (or force component) applied thereto, and the position of the reflecting surface is related to the magnitude and direction of the applied force.

In accordance with another aspect of the invention, a structure for a multi-axis force sensor is compact in that it comprises a single strand of optical fiber and a single, movable reflecting surface separated from the fiber end-face by a gap, and yet is capable of measuring axially and/or laterally applied forces with high sensitivity. The force to be measured may be applied directly to the reflecting surface or indirectly thereto; that is, the force may be applied to a deformable casing that encloses or encapsulates the reflecting surface, the gap and the fiber end-face. Deformation of the casing causes the reflecting surface to move (i.e., translate, deform or tilt), but once the force is removed, the casing being elastic returns to its original shape.

In a significant feature of the invention, the single strand of fiber is configured to have multiple cores that carry multiple optical interrogation signals (or light beams) through an end-face of the fiber to be incident on the single reflecting surface (or mirror). Importantly, the cores are configured so that the propagation vectors of the interrogation signals, as the signals emanate from the fiber end-face, point in different directions. Furthermore, each core is configured to capture a portion of its own light beam back-reflected from the reflecting surface. The amount of optical power coupled back into each core is a function of the position of the reflecting surface relative to the fiber end-face, which in turn is a function of the magnitude and direction of the applied force.

In accordance with one embodiment of the invention, the multiple cores are twisted around the longitudinal axis of the fiber so that the propagation vectors of the interrogation signals, as the signals emanate from the fiber end-face, point in different directions, as discussed above. In a preferred design of some embodiments of the invention, the multiple cores are helically twisted around the longitudinal axis of the fiber.

In accordance with another embodiment of the invention, the multiple cores are straight and parallel to the longitudinal axis of the fiber, and a graded index (GRIN) lens is disposed between the end-face of the fiber and the reflecting surface. The GRIN lens is configured so that the propagation vectors of the interrogation signals, as the signals emanate from the GRIN lens end-face, point in different directions, in a fashion analogous to that discussed above. For cores that are peripherally located, the propagation vectors of the interrogation signals, as the signals emanate from the GRIN lens end-face, are non-perpendicular, whereas for a central core, the beam is perpendicular to the end-face. Also, depending on the length and optical properties of GRIN lens, the interrogation signals emanating from the GRIN lens are collimated or focused.

In another preferred design of some embodiments of the invention, the sensor includes at least three cores in either the design using twisted fibers or the one using straight fibers and a GRIN lens.

BRIEF DESCRIPTION OF THE SEVERAL VIEWS OF THE DRAWING

Our invention, together with its various features and advantages, can be readily understood from the following more detailed description taken in conjunction with the accompanying drawing, in which:

FIGS. 3A, 3B and 3C are schematic views of a fiberoptic force sensor in accordance with one embodiment of the invention, where FIG. 3A represents the condition or state just prior to the application of an external force $F_3$; FIG. 3B represents the condition of an axially applied external force $F_1$; and FIG. 3C represents the condition of a laterally applied external force $F_2$;

In FIG. 12B the incident angle $\theta_i$=1°;

DETAILED DESCRIPTION OF THE INVENTION

General Structure

Figure 3A:
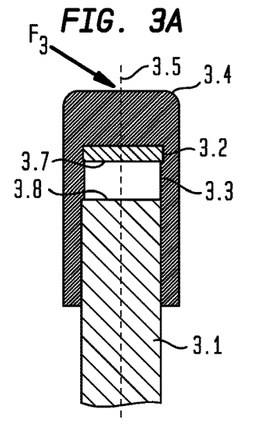
Figure 3B:
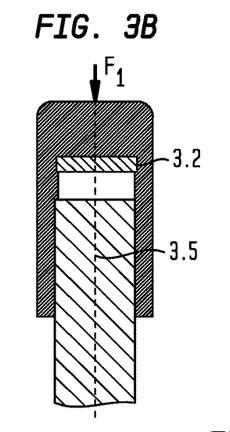
Figure 3C:
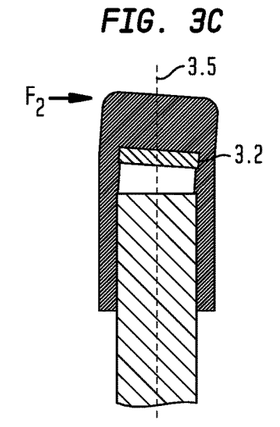

In accordance with one aspect of the invention, the head (or tip) of a multi-axis fiberoptic force sensor is shown in FIG. 3. The force sensor comprises a multicore fiber (MCF) 3.1 (cores not shown here, but see FIG. 4A) and a movable (i.e., tiltable, translatable, and/or deformable) reflecting element (reflector or mirror) 3.2 having a reflecting surface 3.7 separated from an end-face 3.8 of the MCF 3.1 by a small gap 3.3. Illustratively, the gap is uniform; that is, the gap length (z) is constant. However, in some embodiments a non-uniform gap (e.g., graded z) may be suitable. Furthermore, in some embodiments, the MCF 3.1 and the reflecting element 3.2 are held in place by a deformable (i.e., flexible and/or elastic) casing 3.4 so that when an external force $F_3$ (FIG. 3A) is applied to the casing at an arbitrary angle to the longitudinal axis 3.5 of the MCF 3.1, the casing deforms and the reflecting element 3.2 moves; that is, it either tilts (FIG. 3C), translates (FIG. 3B), or deforms, or all three In this embodiment, the force is said to be applied to the reflecting element indirectly, but in other embodiments the casing may be omitted and the force may be applied to the reflecting element directly; for example, in an embodiment not shown, a reflecting element is bonded to the end-face using flexible epoxy material with an appropriate thickness.

In FIG. 3A the sensor head is shown at a stage just prior to deformation of the casing 3.4. However, since the force $F_3$ can be decomposed into orthogonal force components $F_1$ and $F_2$ using conventional vector analysis, FIGS. 3B and 3C are used to describe the effect such components have on the reflecting element 3.2. Thus, when a force component $F_2$ is applied laterally (i.e., perpendicular to fiber axis 3.5; FIG. 3C), the reflecting element 3.2 gets tilted with respect to the axis 3.5. In contrast, when a force component $F_1$ is applied axially (i.e., along or parallel to axis 3.5; FIG. 3B) the only effect is to reduce the length of the gap (i.e., the gap is uniformly compressed). When both components are applied simultaneously (as is the case of an obliquely applied force $F_3$), then the tilting and compressing effects are combined in the movement of the reflecting element.

When the applied force is removed from the casing 3.4, it returns to its original shape.

The deformable casing 3.4 thus acts as a transducer for converting applied force into a proportional tilt of the reflecting element 3.2; the position of the reflecting surface 3.7 (i.e., its orientation and separation distance, discussed below) are then measured using suitable optical interrogation signals made to propagate in the cores of the MCF 3.1.

Figure 4A:
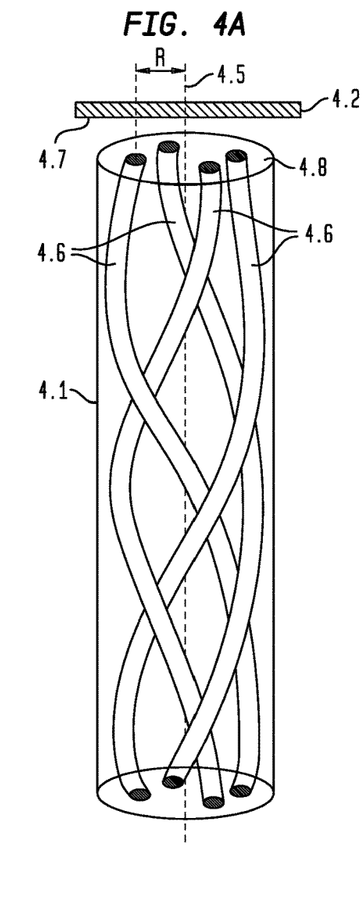
FIG. 4A is schematic view of a twisted multicore fiber (MCF) optic force sensor in accordance with another embodiment of the invention.

As shown in FIG. 4A, the multiple cores 4.6 of the MCF 4.1 are located peripherally and symmetrically with respect to the longitudinal axis 4.5 of the MCF and are used to guide multiple interrogation beams (or signals) to the reflecting element 4.2. According to one embodiment of the present invention, the multiple cores 4.6 are twisted (e.g., helically) along the length of the MCF 4.1 and around its axis 4.5, with a predetermined twist rate. Helical twist causes light in each core to travel with a propagation vector k that makes a predetermined non-zero incident angle θi (FIG. 4B) to a cross-sectional plane normal to fiber longitudinal axis 4.5 (i.e., to end-face 4.8) The fiber is cleaved or polished to form end-face 4.8 perpendicular to the longitudinal axis 4.5 of the MCF fiber 4.1. For cores that are located peripherally and symmetrically around fiber axis 4.5, the angles $\theta_i$ for such peripheral cores are the same, although the propagation vectors point in different directions. In addition to the peripheral cores 4.6, the sensor head may include a central core (e.g., FIGS. 6B, 6C and 6D) that extends along the longitudinal axis 4.5). Light travelling in such a central core has a propagation vector along the axis 4.5, resulting in $\theta_i=0$.

Figure 4B:
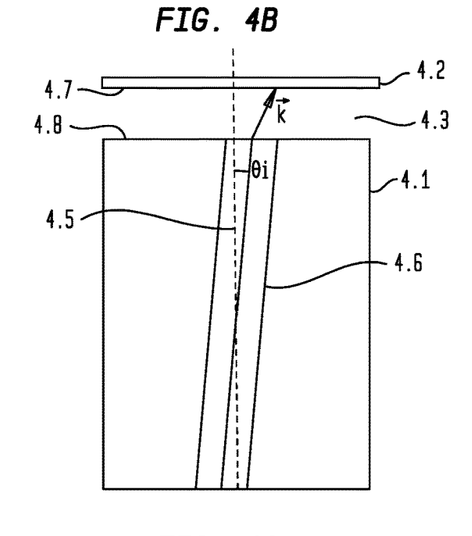
FIG. 4B is schematic view of the sensor of FIG. 4A showing how a core intersects the fiber end-face at an angle.
Figure 9:
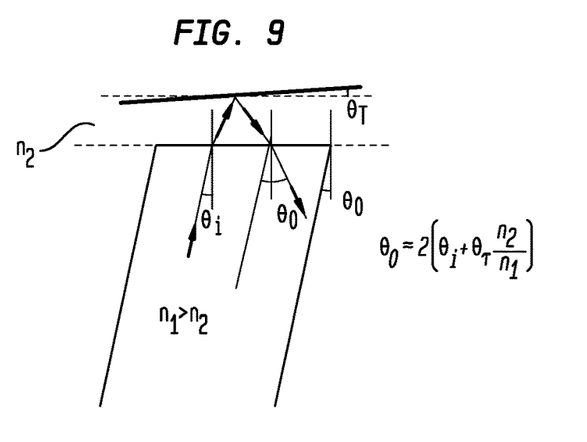
FIG. 9 is a schematic view of the end-face of a fiber illustrating the orientation of interrogation light beams emerging from a peripheral core of a twisted MCF and of back-reflected entering into the same core.

Note, if the refractive index of the gap 4.3 ($n_2$) is less than that of the fiber 4.1 ($n_1$), then k will bend to the right toward the end-face 4.8 as shown in FIG. 4B (and FIG. 9).

Assuming that each core 4.6 has a uniform twist rate of N turns per meter and is located at a distance R from the axis 4.5 of the fiber (FIG. 4A), the angle $\theta_1$ (FIG. 4B), between the fiber axis 4.5 and the propagation vector k of the interrogation light beams within the core, is given by $\sin^{-1}(2\pi RN)$. When $2\pi RN \ll 1$, the inverse sine relationship is closely approximated by $\sim 2\pi RN$.

With this configuration of the sensor, when a force is applied to the sensor head from a particular direction (e.g., $F_3$; FIG. 3A), the resulting movement of the reflecting surface 3.7 (FIGS. 3B, 3C) causes a different amount of optical power of the back-reflected light to be coupled into the respective cores. The position of the reflecting surface can be determined from the coupling losses associated with the multiple cores. The term position, as previously defined, denotes a combination of the orientation of the reflecting surface relative to the fiber end-face and a distance it is separated from that end-face.

Figure 4C:
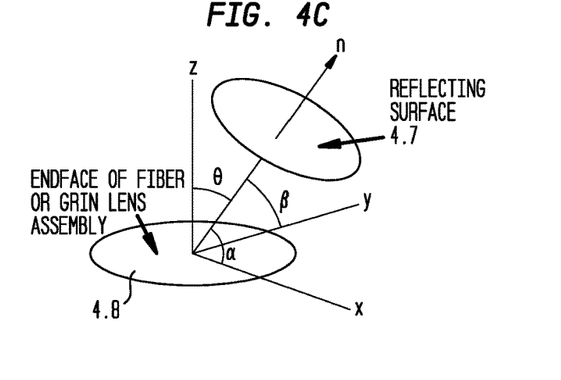
FIG. 4C shows a rectangular coordinate system for defining the position of the reflecting surface relative to the fiber end-face.

The orientation constitutes three angles (θ, α, β) as shown in FIG. 4C and defined as follows: The normal n to the reflecting surface 4.7 produces arbitrary angles with respect to the rectangular coordinate system having the x-y coordinates drawn in the plane of the fiber end-face 4.8 and the z-axis drawn perpendicular thereto. The angle α is the angle n makes with respect to the x-axis; the angle β is the angle n makes with respect to the y-axis, and the tilt angle θ is the angle n makes with respect to the z-axis.

The separation distance may include a relative distance from the center of the reflecting surface 4.7 to the center of the end-face 4.8 of the fiber (or other light-guiding optical element), or a relative distance from an edge of the reflecting surface to an edge of the end-face, and/or a relative distance of any points therebetween. The separation distance may include an average measurement of the distance between the end-face and the reflecting surface (e.g., an average measurement of any of the distances discussed above). Accordingly, the separation distance may account for a gap length between the end-face and the reflecting surface as well as any changes in the gap length created by movement of the reflecting surface.

For the same tilt angle θ, the amount of reflected light that gets coupled (back-reflected from reflecting surface 4.7) into the various cores 4.6 varies as α and β vary in response to an applied force. In other words, by measuring the coupling losses for different cores 4.6, one is able to calculate the orientation (θ, α, β) and the separation distance of the reflecting surface 4.7, hence the position of that surface, which, in turn, enables one to calculate the magnitude and direction of the applied force. (Details of such calculations are set forth, infra, in the section entitled Analysis.)

To reduce cross-talk between cores, the sensor head is designed so that all (or essentially all) interrogation beam light emanating from a particular core is back-reflected into the same core. No significant amount of light from one core should be coupled into other cores.

The purpose of using a twisted-core MCF is two-fold: First, tilt of the reflecting surface in a particular direction (caused by an applied external force; e.g., $F_3$, FIG. 3A) results in a tilt-induced-differential change of back-reflected light coupled into the individual cores, as illustrated in FIG. 4. Since each core itself is tilted in a different direction with respect to the fiber axis, any change in the coupling loss due to the reflecting surface's tilt is different for different cores. Interrogation beams emanating from the multiple cores at non-perpendicular angles with respect to the end-face 4.8 effectively provide a bias to the reflecting surface's tilt angle, which allows the direction of tilt to be determined in the presence of multiple cores. Second, the sensor's sensitivity, defined as the change in coupling loss (dB) per degree change in tilt angle, is significantly increased.

Figure 5A:
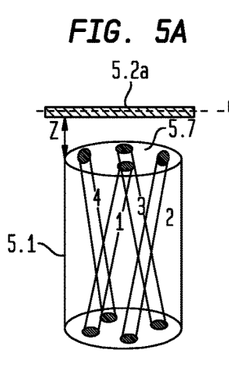
FIGS. 5A, 5B, 5C and 5D are schematic views used to describe the operating principle of a twisted MCF force sensor, in particular how back-reflection into the cores depends on the reflecting surface tilt induced by an applied force.
Figure 5B:
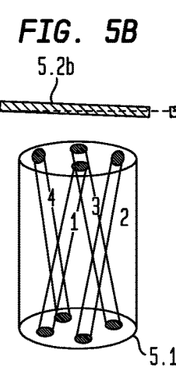
Figures 5C, 5D:
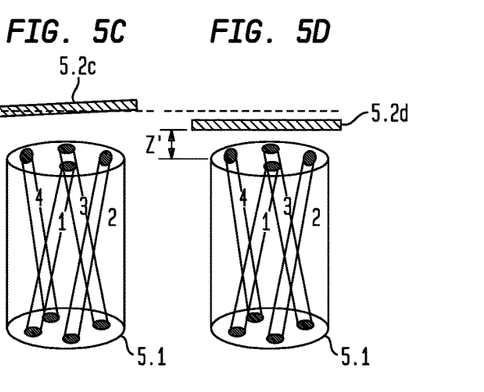

FIG. 5 shows an exemplary MCF-based force sensor having four twisted cores 1-4. (For simplicity, the twist is not shown; hence, the fibers 1-4 are depicted as being straight; equivalently FIG. 5 may be considered as showing only the tips of fibers that are otherwise twisted.) The MCF 5.1 is positioned so that its end-face 5.7 is separated from reflecting surface 5.2a (FIG. 5A) by a small gap of length z. FIGS. 5B and 5C illustrate that as applied external forces (not shown) cause the reflecting surfaces 5.2b, 5.2c to be tilted, the amount of optical power back-reflected into each of the cores is different from one core to another. On the other hand, when an external force is applied in the axial direction (FIG. 5D), the reflecting surface 5.2d does not tilt. Rather, it is displaced (translated) axially toward the end-face of the MCF; that is, the gap length uniformly decreases to z', resulting in equal changes in the amount of light (power) back-reflected into each of the cores. Therefore, in the situation depicted by FIG. 5D the amount of optical power back-reflected into each core is the same.

The minimum number of cores guiding light with different propagation directions that is required to uniquely determine the force-induced position of the movable reflecting surface (equivalently, the magnitude and direction of an applied external force) is at least three (e.g., FIG. 6). A set of cores that is capable of sensing the longitudinal or axial components of force can even consist of one central core and two peripheral cores, which means the cores can be asymmetrically located in making the force sensor. The distance between the peripheral cores from the center may also be different. It is, however, beneficial to adapt a fiber, where the cores are symmetrically positioned, that offers simplicity in relating the force components to the back-reflected light coupled into these cores.

Figure 6A:
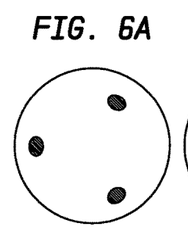
FIGS. 6A, 6B, 6C and 6D are cross sections of twisted MCFs used for sensing lateral or axial forces. Note, the elliptical shape of the ends of the cores indicates they intersect the MCF end-face at non-perpendicular angles.
Figure 6B:
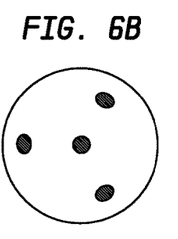
Figure 6C:
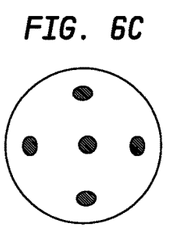
Figure 6D:
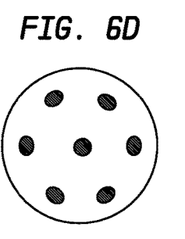

A larger number of cores can be incorporated as long as they are located peripherally around the fiber axis as shown in FIG. 6B for four cores, FIG. 6C for five cores and FIG. 6D for seven cores. The MCF can also incorporate a straight (untwisted) central core along the fiber axis (FIGS. 6B, 6C and 6D), as mentioned previously. Since the change in coupling loss of back-reflected light due to tilt for a central core is minimal (as it depends only on θ, but not on α and β of FIG. 4C), the optical power coupled therein can serve as a reference.

Instead of three cores that are minimally required to measure the force components uniquely, as described above, MCF with a fewer number of cores can be used, such as (i) two peripheral, and (ii) one central and one peripheral core, when one needs to measure only the tilt angle (not all three orientation angles) resulting from an external lateral force, or a gap change due to an external axial force.

The gap between the reflecting surface and the end-face of the MCF (or the end-face of the GRIN lens described below) preferably has the following characteristics: (i) it is transparent (or essentially transparent) at the wavelength of the light of the interrogation beams; and (ii) it is deformable in response to an external force applied to the reflecting surface (directly or indirectly). It can be filled with a material that is a solid, liquid or gas (e.g., air, nitrogen). As shown in Eq. (1) and (2) that follow, the losses due to tilt angle and gap length are dependent on the refractive index of the medium filling the gap. Therefore, by choosing a material with an appropriate refractive index, it is possible to adjust the magnitude of these two losses as well as their sensitivities to a reflecting surface's tilt angle and gap length.

Optionally, the refractive index of the gap material is substantially similar to that of the MCF (or the GRIN lens).

To suppress Fresnel reflection from the end-face of the MCF (or the GRIN lens) the fiber tip may also be provided with an antireflection coating (not shown).

Alternative to the Twisted Fiber Embodiments

An alternative embodiment of the force sensor head based on the same principles described above is shown in FIG. 7. The sensor head 7.0 uses a MCF 7.1, but the central core 7.9 as well as the peripheral cores 7.61 to 7.63 are straight (parallel to the fiber axis), not twisted. Instead, the effect of twisting of the peripheral cores (and causing the light to emit with propagation vectors in different directions) is achieved by disposing a graded-index (GRIN) lens 7.8 on fiber end-face 7.7 and between the MCF 7.1 and the reflecting element 7.2.

The GRIN lens has an approximate length of ¼ pitch; where the pitch is related to the refractive index gradient constant g following the equation: pitch=$2\pi/g$. In general, the GRIN lens has a length of approximately $m\pi/2$ g, where m is a positive, odd integer.

Figure 7A:
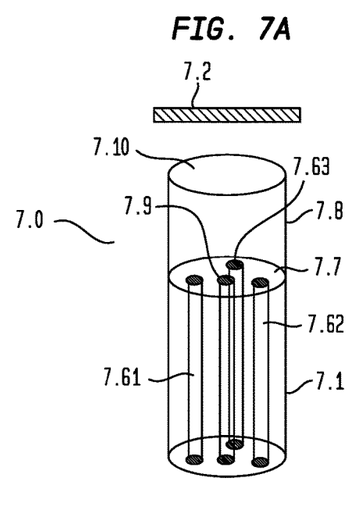
FIGS. 7A and 7B are schematic views of an alternative embodiment of the invention in which a MCF is coupled to a GRIN lens.

When a small spot size, Gaussian reference beam is launched into the central core 7.9, the light emanating from that core at the GRIN lens end-face 7.10 is collimated in a direction parallel to the fiber axis (and perpendicular to the GRIN lens end-face). In contrast, when similar small spot size Gaussian interrogation beams are launched into the pheripheral cores 7.61 to 7.63, light beams emanating from those cores are also collimated but emerge at specific, non-perpendicular angles to the GRIN lens end-face. The angles are determined by the properties of the GRIN lens and the distance by which the peripheral cores are offset from the MCF longitudinal axis.

Figure 7B:
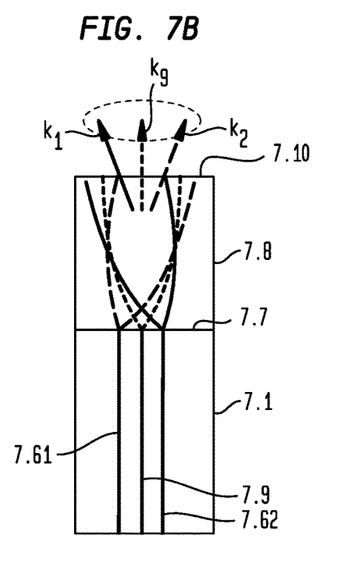

These angles are illustrated more clearly in FIG. 7B, but, in the interests of simplicity and clarity of illustration, only for the central core 7.9 and peripheral cores 7.61 and 7.62. Thus, the GRIN lens causes the interrogation beam in core 7.9 to emanate perpendicular to the lens end-face 7.10 as shown by propagation vector $k_9$. On the other hand, interrogation beams guided by the peripheral cores emanate from the lens end-face 7.10 at non-perpendicular angles with different directions, as demonstrated by the propagation vectors $k_1$, $k_2$, corresponding to cores 7.61 and 7.62, respectively. The result is that light beams from the peripheral cores are incident on the reflecting element 7.2 at non-perpendicular angles, in a fashion similar to those generated by the twisted-core MCF force sensing device described in the previous sections (FIGS. 3-6). A force-induced tilt in the reflecting element 7.2 causes a differential change of coupling loss for light back-reflected into the multiple peripheral cores 7.61, 7.62, and 7.63 and also the central core 7.9. Moreover, because of the GRIN lens, the size (area) of each interrogation beam incident on the reflecting surface is greatly expanded, which is beneficial for reducing the effect of surface imperfections or roughness in the reflecting surface. Since light from each core emerges as a collimated beam (due to the GRIN lens), the mode-field diameter (MFD) is significantly expanded, which reduces the optical loss due to the gap and at the same time increases the tilt-induced loss. The effect of MFD on the performance of the device will be explained further in a later section.

Figure 8A:
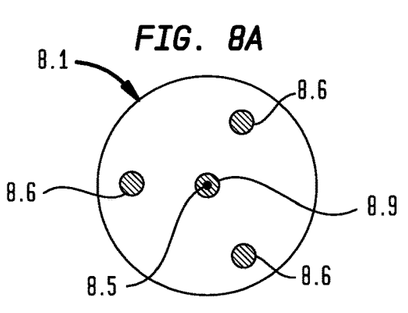
FIG. 8A is cross-sectional view of a non-twisted MCF with a central core and useful in the force sensor of FIG. 7A.
Figure 8B:
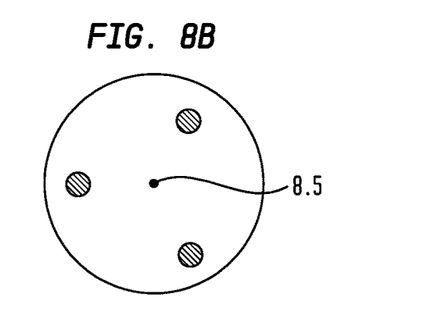
FIG. 8B is a cross-sectional view of non-twisted MCF in the absence of a central core. Note, the circular shape of the ends of the cores indicates they intersect the MCF end-face at perpendicular angles.

FIG. 8A illustrates the cross section of the non-twisted MCF as an exemplary embodiment. The fiber 8.1 has three peripheral cores 8.6 arranged in 3-fold symmetry and a single, central core 8.9 that extends along a longitudinal axis 8.5. It is beneficial to have a core in the center that can carry an optical reference signal, as mentioned previously. For the peripheral cores 8.6, the coupling loss of back-reflected beams from the reflecting surface depends on both the beam angle and orientation of the reflecting surface (tilt in particular), whereas for the center core coupling loss depends only on the tilt angle.

Analysis

When a light beam emanating from an optical fiber end-face is back-reflected by a reflecting surface placed nearby (a gap length z away), a fraction of the reflected light is coupled back into the fiber and the remainder constitutes coupling loss. The coupling loss consists of two parts; i.e. loss due to the gap and loss due to a tilt in the reflecting surface.

For a single mode fiber the coupling loss of reflected light due to tilt of the reflecting surface by an angle $\theta_T$ is expressed in Eq. (1), as follows:

$$\text{Loss (dB)} = 4.343\left(\frac{\pi n_1 \omega_0 \theta_0}{\lambda}\right)^2 = 4.343\left(\frac{\pi n_1 \omega_0}{\lambda}\right)^2\left(2\theta_i + 2\theta_T \frac{n_2}{n_1}\right)^2 \quad (1)$$

As shown in FIG. 9, $n_1$ is the effective refractive index of the optical fiber (e.g., a MCF), $\omega_0$ is the spot size (half of the MFD), $\lambda$ is the wavelength in air of the optical interrogation signals or light beams, $n_2$ is the refractive index of the material (or medium) in the gap, $\theta_i$ is the angle between the direction of light propagation (the propagation vector k) within the core and the longitudinal axis of the fiber, which equivalently corresponds to the tilt of the core with respect to the fiber axis, and $\theta_o$ is the angle between the direction of back-reflected light propagation within the fiber and the fiber axis.

Loss due to a gap of length z is given by Eq. (2), as follows:

$$\text{Loss}_{Gap} \text{ (dB)} = 10\log\left[1 + \left(\frac{z}{Z_R}\right)^2\right] \quad (2)$$

where $Z_R$ is the Rayleigh distance of a Gaussian light beam emanating from the fiber's end-face and is given by Eq. (3), as follows:

$$Z_R = \frac{\pi n_2 \omega_0^2}{\lambda} \quad (3)$$

Figure 10:
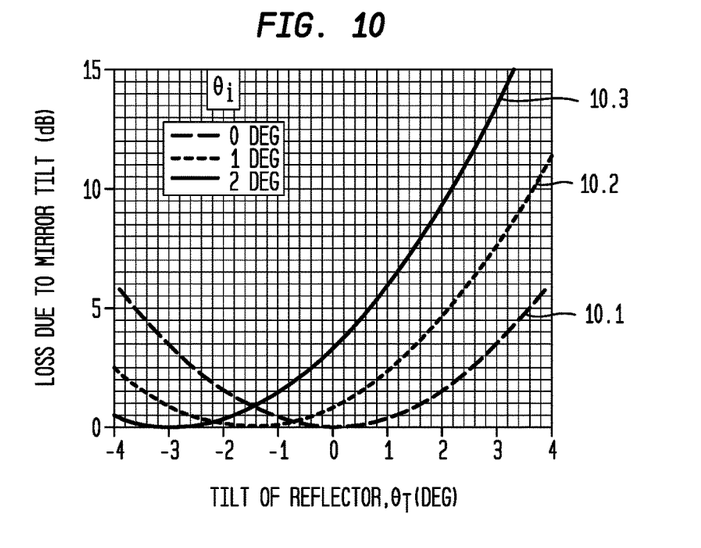
FIG. 10 is a graph of coupling loss vs. reflector tilt for light back-reflected into the core of a fiber. The three curves are plotted for different $\theta_i$ (the angle between core axis and the longitudinal axis of the fiber)
Figure 11:
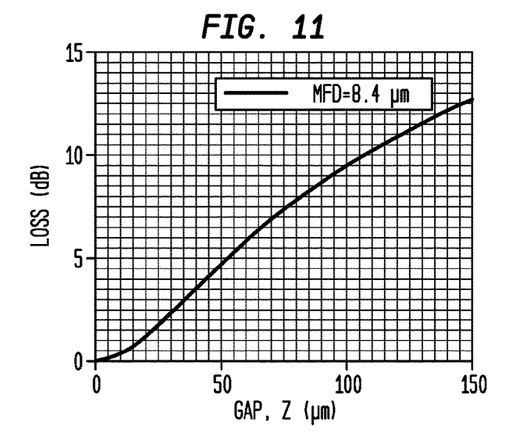
FIG. 11 is a graph showing the contribution of calculated coupling loss due solely to gap length (z) between the reflecting surface and the fiber end-face. The gap is assumed to be air, and the mode-field diameter (MFD) is 8.4 µm.

Losses due to different gap lengths and different tilt angles for non-twisted or straight MCFs ($\theta_i=0$) and also for twisted MCFs ($\theta_i=1°$ and $\theta_i=2°$) are shown in FIGS. 11 and 10, respectively. MFD of 8.4 μm, optical wavelength of 1.55 μm (i.e., of the interrogation signals), and a fiber refractive index $n_1=1.467$ were assumed in the calculations. The refractive index $n_2$ of the medium in the gap was assumed to be 1.0.

A tilt angle $\theta_T$ of the reflecting surface can also cause a change in the gap length between the fiber (or GRIN lens) end-face and the reflecting surface. For fiber that has a core located at a distance R from the fiber's longitudinal axis (FIG. 4A), the gap length at the location of the core is changed by $R \sin(\theta_T)$ when the reflector is tilted by $\theta_T$. For an R of 50 μm, for example, the gap length changes by an amount as small as ±3.5 μm, when the reflector is tilted by ±4°. This data indicates that when the reflecting surface is tilted, the change in coupling loss due to the associated gap length change can be neglected, and, therefore, loss can be attributed mainly to the tilt-induced loss; that is, the loss induced by the applied force.

To accommodate for the small change in gap length due to tilt of the reflecting surface, the gap preferably needs to be provided with a minimum length of $0.5\phi \sin(\theta_{Tmax})$, where $\phi$ is the diameter of the fiber or part of a mechanical fixture holding the fiber (not shown in figure) that undergoes a change in separation from the reflecting surface, and $\phi_{Tmax}$ is the maximum angle of tilt of the reflecting surface to be measured by the sensor. Illustratively, when $\phi=1$ mm, and $\theta_{Tmax}=5°$, a minimum gap length of 43 μm is required.

In FIG. 10, also note, since the curve 10.1 is symmetric about $\theta_T=0°$ for non-twisted fiber ($\theta_i=0°$), an ambiguity remains in determining the sign of the tilt angle; i.e., the direction in which the reflecting surface has been tilted. When the cores are twisted, however, the resulting tilt of the core (i.e., the tilt of the propagation vector of light in the core) with respect to the fiber axis provides a bias to reflecting surface tilt, as also can be seen in Eq. (1). The bias breaks the symmetry with reference to tilt angle, making it possible to determine the direction in which the tilt is made. From Eq. (1), it can be seen that for twisted MCF, the loss-versus-tilt curves translate along the abscissa by an amount of $\theta_i(n_1/n_2)$, which determines the maximum amount of tilt that can be measured without any ambiguity.

It is also important to note that, for non-twisted MCF fiber ($\theta_i=0°$), the sensitivity (the change in coupling loss per unit change in tilt angle) becomes small for small tilt angles (~1° or so), as seen in FIG. 10. Here, $d(\text{Loss})/d\theta_T$ tends to zero when $\theta_T$ tends to zero. FIG. 10 further shows that for $\theta_i=1°$ (curve 10.2) the coupling loss changes from 0.08 to 2.3 dB as the tilt angle changes from −1° to +1°. For $\theta_i=2°$), an even larger change, 1.43 to 5.93 dB, is obtained for the same amount of change in tilt angle (curve 10.3). This effect is significantly higher than that observed for non-twisted ($\theta_i=0°$) fiber (curve 10.1), where 0.38 dB is obtained for both $\theta_T=+1°$ or −1°.

Figure 12A:
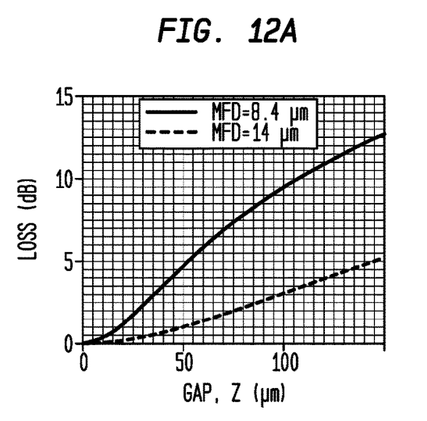
FIG. 12A is a graph comparing the contribution of coupling loss due solely to gap length (z) between the reflecting surface and the fiber end-face calculated for two different MFDs (8.4 and 14 µm). $\theta_i$ and $\theta_T$ are assumed to be zero.
Figure 12B:
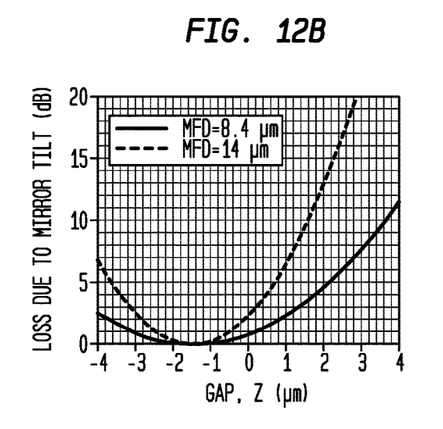
FIG. 12B is a graph of calculated coupling loss due to tilt alone (i.e., gap length, z=0) vs. tilt angle of the reflecting surface for the same two MFDs as in FIG. 12A.

Calculated coupling loss versus gap length (FIG. 12A) and tilt (FIG. 12B) is shown for two different MFDs, 8.4 μm and 14 μm. In FIG. 12B a core tilt $\theta_i=1°$ was chosen. For a MCF with a larger MFD, the loss due to the gap length is reduced while loss due to tilt angle is greatly increased. Thus, the sensor can be made more sensitive to tilt angle (and less sensitive to gap length) by increasing the MFD. Larger MFD can, however, increase the bend loss and intercore coupling (cross-talk) of the MCF, therefore needs to be taken into consideration in a straight-forward engineering manner.

The dynamic range of the sensor can be increased by making the device more sensitive to tilt angle than gap length. As stated above, this can be achieved by increasing the MFD, by increasing $\theta_i$ [the angle between the direction of light propagation (the propagation vector k) at the end-face and the longitudinal axis of the fiber], and by reducing the gap length.

It is also beneficial to apply an antireflection coating on the fiber tip to suppress F-P resonance effects between the fiber tip and the reflecting surface. F-P resonance can produce undesirable fringes that can drift with changes in temperature or with mechanical vibrations, which lowers the dynamic range (as the noise is increased).

The dynamic range can also be increased by well-known differential detection, i.e. comparing the change of coupling loss associated with multiple cores. This approach helps to reduce the coupling loss due to the gap, meaning that the sensor relies on coupling loss due primarily to reflecting surface tilt.

The analysis and discussion presented above shows how the amount of tilt of the reflecting surface and the direction of tilt (orientation) can be measured. Since the tilt in the reflecting surface results from an external applied force, the transduction or spring constant of the sensor's deformable casing needs to be chosen appropriately. In general, sensitive force sensors can be realized by lowering the spring constant of the deformable casing.

Alternative Sensor Head Embodiments

Figure 13:
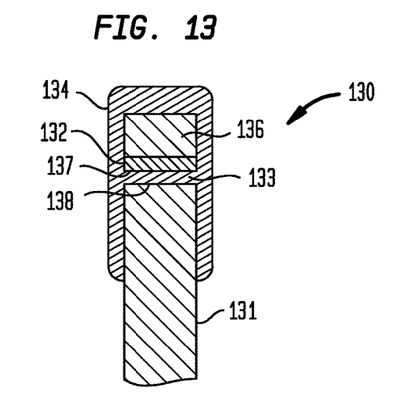
FIG. 13 is a schematic illustrating an alternative tip configuration of a MCF force sensor in accordance with an additional embodiment of the invention.

FIG. 13 shows an alternative embodiment of the invention, a sensor head 130 comprising a MCF 131 (only an end portion is shown) separated from a reflecting element 132 having a reflecting surface 137 facing an end-face 138 of the MCF 131. The end-face 138 is separated from the reflecting surface 137 by a gap 133. A short segment of optical fiber 136 is disposed on the side of the reflector 132 remote from the reflecting surface 137. The function of the fiber 136 is to hold the reflecting surface, therefore a cylindrical glass structure or a metal or some other suitable material with a polished surface (onto which reflecting surface could be affixed) can also be employed. A deformable casing 134 encapsulates the sensor head, including in particular the tip of MCF 131, the reflecting element 132, and the fiber segment 136. The gap 133 between the reflecting surface 137 and the end-face 138 can be filled with a suitable optically transparent, deformable material of the type previously described. The casing and the gap can also comprise the same deformable and optically transparent (solid) material, which would facilitate constructing the sensor, for example, by using an appropriate, well-known molding technique.

Examples

In this section, various materials and dimensions are provided for various components and parameters associated with the invention for the purposes of illustration only, and unless otherwise indicated, should not be construed to limit the scope of the invention as set forth in the claims.

FIG. 3A: The MCF 3.1 is typically a silica fiber; the reflecting element 3.2 typically comprises a metal or a dielectric coating; and the deformable casing typically comprises a polymer (thermally or UV curable), a metal, a metal alloy, or a memory metal (e.g., nitinol).

FIG. 3A or FIG. 13: The length of the gap is typically between approximately 25 μm and 1 mm.

FIGS. 3A, 13: The gap is filled with a solid, liquid or gaseous (e.g., air, nitrogen) material that is deformable, transparent to the light beams emanating from the MCF (or GRIN lens). Optionally, the material is also index-matched to the MCF (or GRIN lens).

FIG. 4A: The twisted MCF 4.1 typically has a twist rate of approximately 5-500 turns/meter.

FIGS. 6B, 6C, 6D or FIG. 7A: The distance R between the central core region and each of the peripheral core regions is approximately 25-200 μm.

FIGS. 3, 4, 6, 7: The interrogation beams typically have a MFD of approximately 5 to 20 μm.

FIGS. 3, 4, 6, 7, 13: The force sensors herein have been described as utilizing single-mode fiber. However, the principles of the invention are also applicable to such sensors incorporating multimode fibers.

Applications

Figure 14:
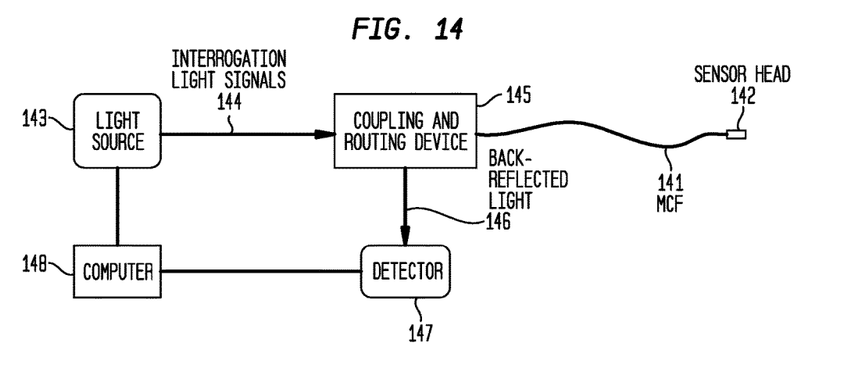
FIG. 14 is a block diagram of a force measuring system incorporating a MCF force sensor in accordance with an illustrative embodiment of the invention.
Figure 15:
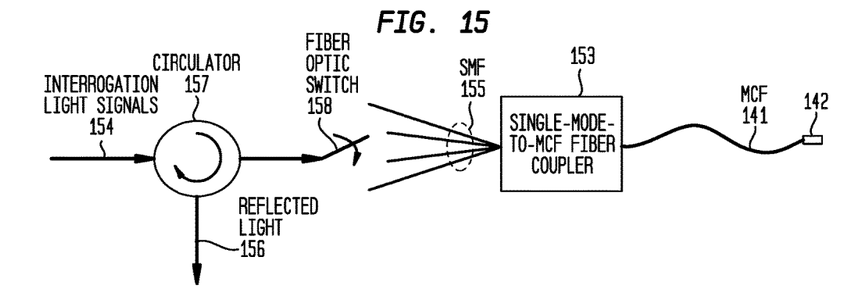
FIG. 15 is a schematic view of the coupling/routing device of FIG. 14 in which each core of the MCF is interrogated one at a time (i.e., serial processing)
Figure 16:
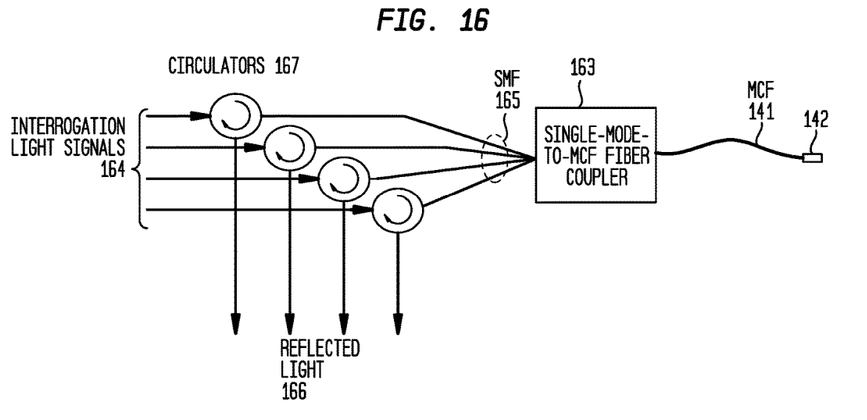
FIG. 16 is a schematic view of the coupling/routing device of FIG. 14 in which all of the cores of the MCF are interrogated simultaneously (i.e., parallel processing).

Force sensors in accordance with the invention may be incorporated into a computer-controlled measurement system of the type illustrated by the block-diagram of FIG. 14. This system includes the following components: light source 143, optical detector 147, coupling/routing device 145 and computer 148. Interrogation signals 144 generated by light source 143 are transmitted through coupling/routing device 145 to the cores of a MCF 141, either to one core at a time (a form of serial processing; FIG. 15) or to all cores simultaneously (a form of parallel processing; FIG. 16).

The tip of the MCF 141 has a sensor head 142 of the type described previously with reference to FIGS. 3-13. A force (not shown) to be measured is applied to the sensor head 142. Illustratively, the sensor head is inserted into a medical catheter (not shown) which, in turn, is inserted into a patient's body (e.g., into a blood vessel or organ). A typical force to be measured is produced when the sensor tip makes contact with, for example, the wall of a patient's blood vessel, organ (e.g., heart), or both.

Back-reflected light 146 from the sensor head (i.e., from the movable reflecting surface therein) is coupled through coupler/router 145 to optical detector 147, which in turn provides corresponding electrical inputs to computer 148. The analytical approach described previously is programmed into the computer, which calculates the tilt angle and orientation of the reflecting surface from the power of the back-reflected light coupled into each core. Further calculations by computer 148 generate the magnitude of the applied force.

The sensor can also be calibrated by applying known forces externally, and the data can be stored in the computer for measurement of unknown forces.

Two embodiments of the coupling/routing device 145 of FIG. 14 are shown in FIGS. 15 and 16. In the device of FIG. 15 an interrogation signal 154 is coupled into an input port of a circulator 157 to a fiber optic switch 158, which is actuated to couple an interrogation signal to an array or bundle of single-mode fibers (SMFs) 155. Only one SMF is interrogated at a time, and a SMF-to-MCF coupler 145 couples the interrogation signal to a predetermined one of the cores of the MCF. Back-reflected light 156 from the sensor head 142 is coupled through the system in the reverse direction and emerges from an output port of circulator 157. Then, the switch 158 is actuated to couple the next interrogation signal to another one of the MCF cores, and the process is repeated until the required cores have been interrogated.

Serial interrogation is also advantageous because it eliminates cross-talk between cores since only one core carries an interrogation light beam at a time.

The arrangement of FIG. 15 also includes an electronic synchronizer (not shown, but well known in the art) for synchronizing the coupling/routing device 145 so that computer 148 knows the correspondence between the back-reflected signal measured and the particular core it came from. Alternatively, the arrangement of FIG. 16 does not require such a synchronizer.

In the device of FIG. 16, on the other hand, all cores of MCF 141 are interrogated simultaneously. To do so, the single circulator 157 of FIG. 15 is replaced with a multiplicity of circulators 167, each of which simultaneously receives an interrogation signal 164 and couples that signal through a SMF bundle 165 and a SMF-MCF coupler 163 to MCF 141. Likewise, back-reflected light 166 from each of the cores is simultaneously transmitted back through the system and simultaneously emerges from the output ports of the circulators 167. It is to be understood that the above-described arrangements are merely illustrative of the many possible specific embodiments that can be devised to represent application of the principles of the invention. Numerous and varied other arrangements can be devised in accordance with these principles by those skilled in the art without departing from the spirit and scope of the invention.

I claim:

1. A fiberoptic device for sensing axial and/or lateral components of force comprising:
   a movable reflecting surface onto which interrogation light beams are directed, wherein a position of said movable reflecting surface is responsive to at least one of said axial and lateral components of said force; and
   an end-face spaced apart from said movable reflecting surface so as to form a gap therebetween; and
   an optical fiber having a longitudinal axis and having a multiplicity of core regions for directing a multiplicity of said interrogation light beams, either serially or simultaneously, onto different locations of said movable reflecting surface;
   said interrogation beams being directed toward said movable reflecting surface such that at least two of said interrogation beams are incident on said movable reflector reflecting surface from different directions from one another, portions of each of said interrogation beams being back-reflected from said movable reflecting surface into the same core region from which said portion emanated, and
   said back-reflected portions being related to at least one of said components of said force.

2. The device of claim 1, further including:
   a deformable casing surrounding said movable reflecting surface, said optical gap and said end-face, said force being applied to said deformable casing so as to deform said casing and cause said movable reflecting surface to move.

3. The device of claim 1, wherein said end-face is one of an end-face of said optical fiber and an end-face of a graded index (GRIN) lens.

4. The device of claim 3, wherein said GRIN lens has an index gradient constant (g) and has a length that is an odd multiple of ¼ pitch, where pitch=$2\pi/g$.

5. The device of claim 1, further including a GRIN lens, wherein said interrogation beams are directed toward said movable reflecting surface via said GRIN lens so that said interrogation beams have propagation vectors with directions different from one another at said movable reflecting surface.

6. The device of claim 1, wherein at least one of said core regions is located peripherally and is twisted around said longitudinal axis so that said interrogation beams have propagation vectors with directions different from one another at said end-face.

7. The device of claim 1, wherein at least two of said core regions intersect said end-face in positions symmetrically located around said longitudinal axis and peripherally located around said end-face.

8. The device of claim 1, wherein said multiplicity of core regions includes a central core region positioned along said longitudinal axis, said central core region configured to direct a reference light beam through said end-face to said movable reflecting surface.

9. The device of claim 1, wherein said gap is filled with a material that is deformable in response to the application of at least one of said force components and is transparent to said optical interrogation beams.

10. The device of claim 1, further including an anti-reflection coating disposed on said end-face, said gap being formed between said coating and said movable reflecting surface.

11. The device of claim 1, wherein said deformable casing comprises a substance selected from a group consisting of metals, metal alloys, and polymers.

12. A force measurement system comprising a fiberoptic device for sensing said axial and lateral components of said force according to claim 1,
   a light source for generating said interrogation light beams,
   a photo detector for detecting said back-reflected light,
   a coupling and routing device for coupling said interrogation light beams to selected core regions of said optical fiber and for coupling said back-reflected light to said photo detector, and
   a computer responsive to said photo detector for calculating a magnitude and direction of at least one of said components of said force.

13. The system of claim 12 configured to couple said interrogation light beams to said selected core regions serially, one at a time.

14. The system of claim 12 configured to couple said interrogation light beams to all of said selected core regions simultaneously.

15. A fiberoptic device for sensing axial and lateral components of force comprising:
   a light guiding optical element for carrying a multiplicity of interrogation optical signals and for emitting from an end-face said interrogation optical signals with propagation vectors having directions different from one another; and
   a reflecting surface spaced apart from said end-face, each of said interrogation optical signals emitting from said end-face being directed to said reflecting surface,
   wherein portions of each of said interrogation optical signals are back-reflected from said reflecting surface into said light guiding optical element,
   wherein said back-reflected portions are related to a position of said reflecting surface with respect to said light guiding optical element.

16. The device of claim 15 further including a casing that encapsulates and holds in place said light guiding optical element and said reflecting surface.

17. The device of claim 16, wherein said position of said reflecting surface with respect to said light guiding optical element is responsive to said lateral and axial components of said force applied to said reflecting surface through said casing.

18. The device of claim 15, wherein said light guiding optical element is an optical fiber having a multiplicity of cores, one of which being a peripheral core twisted around a longitudinal axis of said optical fiber.

19. The device of claim 15, wherein said light guiding element includes an optical fiber having multiple a multiplicity of cores and a graded index (GRIN) lens attached at an end of said optical fiber.

20. The device of claim 19, wherein one of said multiplicity of cores is located at the center of said optical fiber and runs parallel to said longitudinal axis.

* * * * *